July 14, 1931. W. L. DONKIN ET AL 1,814,206
INFLATING AND DEFLATING DEVICE
Filed Nov. 19, 1928

Inventors
William L. Donkin,
Worth G. McCarty.
By A. J. O'Brien
Attorney

Patented July 14, 1931

1,814,206

UNITED STATES PATENT OFFICE

WILLIAM L. DONKIN AND WORTH G. McCARTY, OF LONGMONT, COLORADO

INFLATING AND DEFLATING DEVICE

Application filed November 19, 1928. Serial No. 320,362.

This invention relates to improvements in devices for automatically inflating containers such as automobile tires with air or with gas to a desired pressure, and for automatically deflating such containers to a predetermined pressure if they are overinflated.

The need of an automatic device for use in inflating automobile tires from a reservoir containing air at a higher pressure, has long been recognized, and a large number of devices have been invented and patented whose object it is to accomplish this function. It is not our intention to go into a description of the prior art, but in order to better and more clearly describe our invention, attention is called to the fact that in all prior devices with which we are familiar, the inflation of automobile tires by such automatic means, is very slow and in cases where the inflation takes places at higher speed, the results are not accurate.

It is the object of this invention to produce an inflating device of a simple and substantial construction that shall be especially well adapted for use at filling stations for the purpose of inflating automobile tires with air, but which can also be employed any place where containers are to be inflated to a given pressure, or where a constant supply of air at a predetermined pressure is to be maintained, as for example, in connection with air and gas burners and other similar purposes.

It is the object of this invention to produce a device of the type described which shall be so constructed that in inflating a container to a given pressure, a substantial difference in pressure will be maintained at all times between the interior of the container and the end of the supply hose by means of which the air or gas is conducted to the container from the storage reservoir. It is a further object of this invention to produce a device in which the supply of air is controlled by the pressure in the container as distinguished from devices that employ what may be termed a reducing valve and which are therefore controlled in their action by the pressure in the conduit while the air or gas is flowing into the container and which, therefore, are not subjected for control purposes to the exact pressure in the container.

This invention briefly described comprises in combination, a reservoir or storage tank, in which air or gas is maintained at a pressure considerably higher than that of the containers to be inflated and which in filling stations is usually maintained at a pressure from 100 to 150 pounds per square inch. Extending from this reservoir is a conduit consisting in part, of the air hose by a means of which connection is made to the valve stem of automobile tires. Located in this conduit is a control device comprising a valve member that is normally in closed position and which prevents air or gas from flowing from the reservoir towards the discharge end of the conduit. The valve has associated with it means that will open the valve when the pressure in that part of the conduit between the valve and the discharge end falls below the pressure to which the container is to be inflated, and which is provided with means that will retain the valve open for a short time after the pressure in the discharge end of the conduit has risen above the pressure to which the container is to be inflated, and which will then close the valve and retain it in closed position until the pressure in the discharge end has fallen to a value lower than that to which the container is to be inflated, and which will open the valve only in case the pressure in the discharge end of the conduit falls below that to which the container is to be inflated.

It is another object of this invention to produce a device of the type described which shall be provided with means for automatically deflating an automobile or other container to which it may be attached if the container is inflated to a higher pressure than that to which the device is adjusted.

It is a still further object of this invention to produce a device of the type described which shall be provided with a by-pass that can be employed when large containers are to be inflated and which will increase the capacity without sacrificing the accuracy of the operation.

The above and other objects to which attention will hereinafter be directed are obtained by means of a construction and an arrangement of parts that will now be described in detail and reference for this purpose will be had to the accompanying drawings in which the preferred embodiment has been illustrated and in which.

Figure 1:
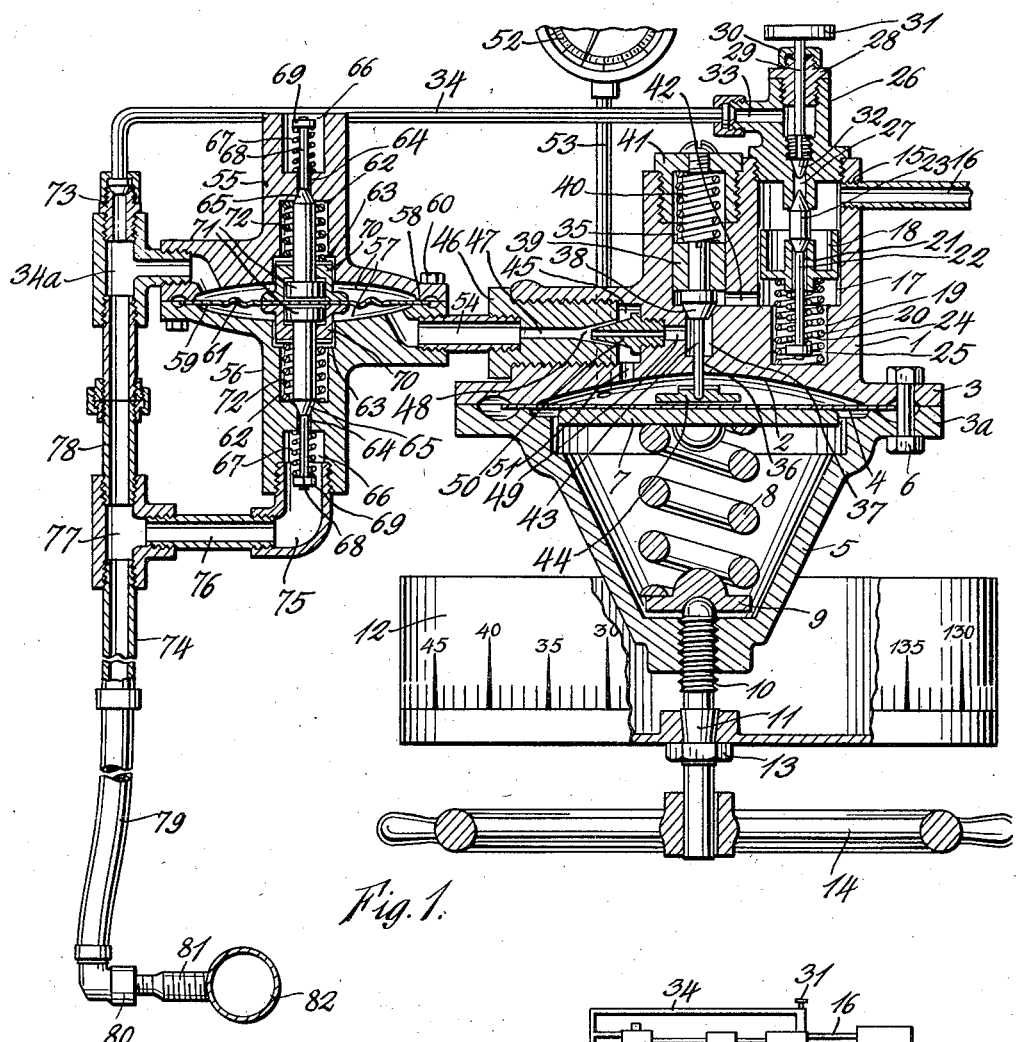
Fig. 1 is a section through one of the devices that forms the subject matter of this invention.

The control device which is employed in connection with this invention is formed in part by a mechanism that resembles the ordinary reducing valves employed for the purpose of maintaining a supply of gas or air at a predetermined pressure when connected with a reservoir containing a gas under a higher and a variable pressure, but has been modified so as to adapt it for this particular use. In the drawing numeral 1 represents a rigid body member one side of which has a concaved surface 2 which is surrounded by a flange 3. A diaphragm 4 which may be formed from a flexible metal plate or from any other suitable flexible air tight material has its edges in contact with the surfaces of flange 3 and is held in place between flange 3 and flange 3a that forms part of a hollow conical cap whose inclined sides have been designated by reference numeral 5. Flanges 3 and 3a are held together by means of bolts 6. A rigid plate 7 rests against the lower surface of diaphragm 4 and is in contact with the upper end of a helical spring 8, whose lower end rests on an adjustable abutment 9 that is controlled by a screw 10. When screw 10 is rotated the tension in spring 8 can be adjusted so as to suit the requirement of the device. Screw 10 is provided with a conical surface 11 to which the cylindrical dial 12 is secured. A nut 13 holds the dial member 12 in adjusted position. A hand wheel 14 is secured to the lower end of screw 10 and serves as a means by which the latter is rotated. The body member 1 is provided with an inlet opening 15 that is connected with a supply reservoir by means of a conduit or pipe 16. Opening 15 communicates with a cylindrical opening 17 of larger diameter and within which is located a piston 18. Extending downwardly from the opening 17 a recess 19 of smaller diameter extends and within which is located a spring 20. This spring engages the lower end of piston 18 and tends to move the same upwardly in the manner shown. Piston 18 is provided with a central opening 21 through which extends the stem 22 of the valve 23. A spring 24 surrounds stem 22 and has its upper end abutting against the lower end of the piston and its lower end abutting the nut 25 on the lower end of stem 22. This spring is under tension and normally holds the valve 23 seated so as to prevent the flow of air through the axial opening 21. The lower end of stem 22 terminates a short distance above the bottom of recess 19 so that when the piston 18 moves downwardly, the end of the stem will strike the bottom of recess 19 and hold it against further movement, thereby permitting the valve to unseat in a manner quite obvious from the drawings. The upper end of cylindrical opening 17 is threaded for the reception of the threaded lower end of plug 26. This plug has an axial opening 27 with the lower end of which the upper conical valve seats. The upper end of plug 26 is closed by means of another plug which has been designated by numeral 28 and which has an axial opening through which valve stem 29 extends. A packing box or gland 30 serves to make an air tight joint and still permits the stem 29 to rotate. A wheel 31 is attached to the outer end of the valve stem and can be grasped by the fingers for the purpose of rotating this stem and adjusting the valve. The lower end of valve stem 29 terminates in a conical valve portion 32 that cooperates with an inclined portion of the wall of opening 27 so as to adjust the area through which air or gas may escape. Plug 26 is provided with a laterally extending outlet 33 which is in communication with one end of conduit 34 to which attention will hereafter be directed. Member 1 is provided with a central opening 35 which consists of several sections having different diameters. The lower end of this opening has been indicated by reference numeral 36 and is preferably quite small. Directly above the restricted portion 36 is a cylindrical section 37 that communicates with opening 35 and the upper end of the walls of opening 37 is made conical so as to form a valve seat with which the valve 38 cooperates in the manner shown. Valve member 38 is secured to a piston 39 that can slide freely in opening 35 and which is acted upon by a spring 40 that is held in place by a cap 41. This spring is under compression and normally holds valve 38 against its seat. Opening 35 is connected with the interior of cylinder 17 by means of an opening 42. Stem 43 extends downwardly from valve member 38 and passes through the opening 36 and terminates within the air chamber which is formed by the concave wall 2 of body member 1 and the diaphragm 4. The stem 43 has a very close fit with opening 36 as the closer this fit can be made the better the device will operate. It would be preferable if the space between stem 43 and the sides of opening 36 could be made so small that no gas or air would flow therethrough, but as this is not practical, it is approached as nearly as possible by making a very close fit between the stem and the sides of the opening. Secured to the lower end of stem 43 is a plate 44 that is adapted to be engaged by the diaphragm when the latter moves upwardly for the purpose of unseating the valve 38. Member 1 is provided with an outlet opening 45 whose interior is threaded for the reception of a plug 46. This plug is provided with an axial opening 47 whose inner end is conical as indicated by reference numeral 48. Opening 45 is connected with opening 37 by means of a short opening 49 to the delivery side of which a nozzle 50 is attached. This nozzle has a conical end which extends into the conical portion 48 of opening 47. The outer surface of the nozzle is spaced a short distance from the inner surface of the conical portion 48 of opening 47 so as to form a structure resembling that of an injector or inspirator. The inner end of opening 45 is connected with the interior of the chamber formed by the diaphragm and concave wall 2 by means of an opening 51. A pressure gauge 52 is also connected to this chamber by means of a conduit 53.

Attached to the outer end of plug 46 by means of a short pipe conductor 54 is a deflating mechanism comprising two rigid body members 55 and 56 each of which has one surface provided with a concave recess 57 and an outwardly extending flange 58. A diaphragm 59 is clamped between the flanges 58 by means of bolts 60 that serve to hold the opposed flanges together. Diaphragm 59 is provided with concentric circular corrugations 61 in the manner shown. Extending inwardly from the centers of the conical recesses 57 are cylindrical openings 62 which are each formed of two sections of different diameters. A shoulder 63 is formed at the juncture of these two sections. Extending outwardly from openings 62 are smaller openings 64 whose inner ends are tapered so as to form seats for the conical valves 65. Openings 64 communicate with openings 66 which are of larger diameter and within which are located the springs 67. Each of the valves 65 are provided with a stem 68 that extends through the openings 64 and through the springs 67. Nuts 69 are secured to the outer ends of stem 68 and holds the springs under tension so that the valves will be normally held in closed position. Located on opposite sides of the diaphragm 59 are cup-shaped members 70, within which are located the enlarged heads 71 of the valves. Springs 72 extend from the bottom of the openings 62 to the bottoms of the cup-shaped members 70 and exert a force tending to hold these members against the opposite sides of the diaphragm. It will be observed from the drawing that the inner ends of the valves are normally spaced a short distance from the diaphragm and from the bottoms of the cups within which they are located. It will also be observed that the bottoms of the cups are spaced a short distance from the shoulders 63. The distance between the diaphragm and the adjacent ends of the head 71 is slightly greater than the distance from the other side of the heads to the bottoms of the cups so that when the diaphragm is flexed from its neutral position the bottoms of the cups will engage the head 71 and unseat the valve on the side of the diaphragm where the greatest pressure exists. It will be observed also that the space between the lower side of the diaphragm and the lower concave surface 57 is connected with the opening 47 by means of the pipe connector 54. The space above the diaphragm is connected with pipe 34 by means of the T 34a and the connector 73. Opening 66 in the lower member 56 is connected to the delivery conduit 74 by means of an L 75, a pipe connector 76, and a T 77. T's 34a and 77 are connected by means of pipes 78 in the manner shown. Secured to the lower end of the delivery conduit 74 is a section of flexible air hose 79 whose free end is provided with a chuck 80 of the usual type employed in connection with air service stations and by means of which connection is made to the valve stems 81 that extend outwardly from the tires 82 that are to be inflated. Of course when containers other than automobile tires are to be inflated, the air chuck 80 may be dispensed with and connection made directly with the container.

Let us now assume that pipe 16 is connected with a reservoir 83 that contains air or any other gas at a higher pressure than that to which the container 82 is to be inflated, and let us assume for the purpose of this explanation that the reservoir contains air at a pressure of 150 pounds per square inch and that the container 82 is to be inflated to a pressure of 50 pounds per square inch. The air chuck 80 is provided with a check valve that is normally closed and which prevents air from escaping except when the chuck is applied to the valve stem in the manner indicated in Fig. 1. Let us now assume that initially conduit 79 and all the passages connected with it that lie on the same side of the valve 38 are at atmospheric pressure, and that the spring 8 has been tensioned so that when the chamber between the diaphragm and the concave side 2 has a pressure less than fifty pounds per square inch, the diaphragm will be moved upwardly by the action on the spring so as to open valve 38. The latter valve will then be open and when pipe 16 is put in communication with container 83, the pressure of the reservoir will be communicated to the cylindrical opening 17 above piston 18 and as the pressure below the piston is atmospheric pressure only, the piston will move downwardly, thereby unseating valve 23, thus permitting air to flow through opening 21. (At present valve 32 will be considered as in closed position). The air flowing through opening 21 will pass through openings 42, 49, 51 into the chamber above the diaphragm. The air passing through the nozzle 50 will also be communicated to the passages terminating at the air chuck 80. When this pressure is exerted on the under side of diaphragm 59 the latter is moved upwardly and unseats the valve 65 on the lower side thereof, thereby permitting air to flow into the interior of pipes 74 and 78. As the air cannot escape the pressure will soon be equalized on both sides of the diaphragm 59 and the latter will then assume the position shown in Fig. 1. As soon as air ceases to flow through the nozzle at any considerable velocity, the injector action of the latter will cease and the pressure in the chamber above diaphragm 4 will soon assume the same value as the pressure in opening 47, and as soon as this pressure exceeds 50 pounds the diaphragm will be moved downwardly to the position shown in which position valve 38 will be seated so as to prevent high pressure air from entering. As soon as this occurs the slight leakage between the sides of piston 18 and the walls of opening 17 permits the pressure on the two sides of this piston to become equalized, and the latter will therefore be moved back to the position shown through the action of spring 20. We now have a condition in which the passages on the supply side of valve 38 contain gas at a pressure of 150 pounds per square inch, whereas all the passages on the delivery side of valve 38 and all chambers in communication with them contains air at a pressure of 50 pounds per square inch.

Let us now assume that the device is to be employed for inflating a tire or other container 82 which we will assume contains air at atmospheric pressure. As soon as the chuck 80 is applied to the valve stem 81, the respective valves in the chuck and in the valve stem are open so as to allow the air contained within the conduit 79 and other passages connected therewith to flow into the container 82. This reduces the pressure in the chamber on the upper side of diaphragm 59 and the latter will then move upwardly due to the fact that the pressure on its lower side is greater than the pressure on its upper side. As soon as the bottom of the recess in the lower cup 70 comes in contact with the under surface of the head 71 of the corresponding valve member 65, the latter will be raised from its seat and this will permit air to flow through opening 64, thereby reducing the pressure in the chamber above diaphragm 4. As soon as the pressure is reduced on the upper side of diaphragm 4, spring 8 will move the diaphragm upwardly, thereby unseating valve 38. As soon as valve 38 is open the pressure on the lower side of piston 18 will be reduced and this piston will therefore move downwardly, thereby opening the valve that controls passage 21. High pressure air will now flow from the reservoir 83 through pipe 16 into chamber 17 and thence through openings 21, 42, 37 and 49 and thence through the opening in the nozzle 50. The stream that issues from the nozzle will have a high velocity and will produce a suction tending to further decrease the pressure on the upper surface of diaphragm 4. It has heretofore been explained that the opening 36 and the stem 43 are such close fit that very little air can enter the chamber through this passage, and therefore, it will be impossible for the pressure to build up in the chamber above diaphragm 4 as long as air is flowing through the nozzle at a high velocity. This high pressure air will increase the pressure underneath diaphragm 59 and will retain valve 65 in open position. As the pressure at the intake end of the nozzle is practically the pressure in the reservoir, it is evident that a large amount of air will soon be transferred to the delivery side of the nozzle and that this will build up the pressure in the passages between the nozzle and the valve stem 81 to such an extent that owing to the diminished pressure gradient the velocity of the air as it emerges from the nozzle will diminish to such an extent that the pressure in the passages in communication with opening 47 will overcome the suction and air will flow into the chamber above diaphragm 4. As this pressure is greater than that for which the diaphragm is adjusted to open, it will immediately flex the diaphragm downwardly against the action of spring 8 and close valve 38. Valve 38 will remain closed until the pressure in the chamber above diaphragm 4 has fallen to the pressure for which the parts have been adjusted, and since all the passages on the delivery side of valve 38 are in communication with the container 82, the pressure in the passages will very quickly become equalized with the pressure in the container so that if the pressure in the container is below the predetermined amount, the spring 8 will again move the diaphragm 4 upwardly, thereby opening valve 38 and this will again inflate the passages on the delivery side to a higher pressure than that in the container and will then close the valve 38 and repeat this operation until the pressure in the delivery passages has attained a value equal to that for which the parts are adjusted, and when this occurs, valve 38 will remain closed. If valve 32 is slightly opened, there will be a by-pass through which high pressure air may pass into the flexible conduit 79 without passing through the nozzle and this increases the capacity of the device and is useful when filling large containers. At this point we will call attention to the obvious fact that when piston 18 starts on its downward movement the upper end of valve 23 will be moved from its valve seat before the lower end of the valve moves from its valve seat, but since the movement of the valve 23 is very short being only about one-thirty-second, or three sixty-fourths of an inch, the opening and closing of these two valves occur substantially simultaneously.

Figure 3:
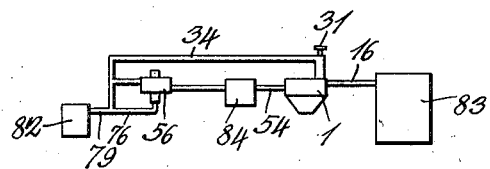
Fig. 3 is a diagram showing the relationship of the different elements comprising the combination.

Fig. 3 is a diagram showing the different elements of this combination. In this diagram 82 represents the tire or other container that is to be inflated and 83 the storage reservoir. The container and reservoir are connected by means of conduits in the manner indicated and the capacity of the passageways on the delivery side of valve 38 in the control device 1 has been designated as a chamber and indicated by reference numeral 84. Numeral 1 represents the control valve, 56 the deflater and 34 the by-pass. It will be seen from the above description that the combination comprises means for connecting a container to a supply reservoir, a valve located in the conduit, means for normally maintaining the valve in closed position, a chamber located between the valve and the container to be inflated, means for opening the valve when the pressure in the chamber is reduced below the predetermined value to which the container is to be inflated, means for maintaining the valve in open position until chamber 84 has been inflated to a pressure considerably greater than the pressure to which container 82 is to be inflated, means for closing the valve and for retaining it in closed position until the pressure in chamber 84 has been reduced to a value below that to which the container is to be inflated, a by-pass and means for deflating the container if its pressure is above the predetermined value. Attention is directed to the face that when the apparatus is in use, valve 38 is opened only if the pressure within chamber 84 and of course in the chamber above diaphragm 4 falls to a pressure below that to which the container is to be inflated. This will always take place as long as the pressure in container 82 after it has been equalized with the pressure in chamber 84 is below the desired amount. When inflation has progressed until the presure in the container is equal to the desired pressure, valve 38 will remain closed.

From the above description it will be apparent that during inflation valve 38 will be opened and closed intermittently and that only a comparative small amount of air will be delivered to the container at each operation and that these operations will continue until the container has been inflated to the value desired, when they will automatically cease. The person inflating a tire can readily tell by the impulses submitted to the flexible air hose 79 when the device is operating and when it ceases operation and therefore no other signal is necessary.

If, it should happen that the pressure in the tire is greater than that for which the device is adjusted, this presure will be communicated to the chamber above diaphragm 59 and the latter will then be flexed downwardly thereby moving valve 65 away from its seat and holding it in open position until the deflation has taken place to a sufficient extent to bring the pressure within the container to the same value as the pressure in the chamber below diaphragm 59. As far as inflating the container is concerned, tube 79 might be connected directly with plug 46, and the deflator entirely eliminated. This is done wherever the use to which the device is to be put does not require deflation but where the device is employed for inflating automobile tires, the deflater is a necessary element as it frequently occurs that tires have been inflated to an excessive pressure and that it is quite necessary to reduce the pressure to the proper value and this can be quickly and accurately accomplished by means of the deflater.

Figure 2:
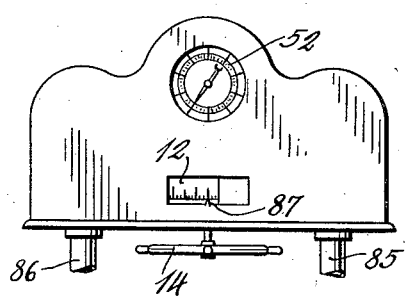
Fig. 2 is a front elevation of the casing in which the mechanism is located.

The device shown in Fig. 1 is preferably placed within a casing somewhat like that illustrated in Fig. 2 and this casing may be supported from the wall of the garage or by the pipes 85 and 86 which extend respectively to the reservoir and to the container. The scale 12 is visible through an opening and is adjusted so that the pointer 87 points to the pressure desired. The reading on the scale 12 and the reading of the pressure gauge 52 should correspond. The design of the housing is of course a matter of taste and the one shown in Fig. 2 is merely suggested as any suitable housing may be employed.

In the above description and on the drawing the present preferred embodiment has been shown and described, but we want it understood that the same or substantially identical results can be obtained by other embodiments and that instead of employing an injector for preventing the building up of pressure in the chamber above diaphragm 4, it is possible to attach to the diaphragm a dashpot or a pendulum in such a way that after valve 38 has opened it will not be closed for a short period, regardless of the value of the pressure. A magnet may even be employed which will act upon the diaphragm when it has moved upwardly and thus make it necessary to increase the pressure to a value beyond the normal pressure before the diaphragm will return. It is also possible to employ an electric motor or a solenoid for opening valve 38 and the closing can be controlled by the pressure in the delivery passages or in chamber 84. We therefore want it understood that we consider this invention broader than the specific embodiment shown and that it is our intention to obtain claims as broad as the prior art permits.

We have already explained that the deflator may be omitted and we will now call attention to the fact that piston 18 and the by-pass may also be omitted as this piston is useful only when a by-pass is employed. When these two parts are omitted, the reducing valve will resemble very closely the ordinary reducing valve but will have, in addition, the nozzle 50 which serves as a means to reduce the pressure in the chamber above the diaphragm and to prevent valve 38 from closing as long as the air is freely delivered from the end of the nozzle; by the simple expedient of this nozzle, the action of an ordinary reducing valve is greatly altered in such a way as to make it serviceable for uses to which it would otherwise be unadapted.

Having described the invention what is claimed as new is:

1. A pressure reducing valve having a chamber formed from a rigid member having a concave side and a flexible diaphragm, means for securing the edges of the diaphragm to the rigid member, resilient means for urging the diaphragm towards the rigid member, said rigid member having an inlet passage, one end of which is in communication with the chamber by an aperture of small area, two valves located in the inlet passage, each of which is normally retained in closed position by means of a spring, the valve nearest the inner end of the inlet passage having means associated with it whereby it may be moved to open position when the diaphragm moves towards the rigid member, the other valve comprising a piston slidably mounted in the outer end of the inlet opening, said piston having an axial opening provided with a valve seat at its outer end, a valve associated with the valve seat and provided with a stem extending through the piston, resilient means for urging the valve against the seat, resilient means for urging the piston towards the outer end of the inlet passage, means for opening the valve in the piston when the latter moves a predetermined distance towards the inner end of the inlet passage, the rigid member having an outlet passage whose inner end is in communication with the chamber between the diaphragm and the rigid member, and a nozzle having one end in communication with the inlet passage between the inner valve and the chamber, the other end of said nozzle extending into the outlet passage whereby when the valves in the inlet passage are open a stream of air will flow through the nozzle and into the outlet passage, thereby producing a suction that tends to reduce the pressure in the chamber to a value below that in the outlet passage.

2. A pressure reducing valve having a chamber formed from a rigid member having a concave side and a flexible diaphragm, means for securing the edges of the diaphragm to the rigid member, resilient means for urging the diaphragm towards the rigid member, said rigid member having an inlet passage, one end of which is in communication with the chamber by an aperture of small area, two valves located in the inlet passage, each of which is normally retained in closed position by means of a spring, the valve nearest the inner end of the inlet passage having means associated with it whereby it may be moved to open position by the diaphragm when the latter is moved to within a predetermined distance of the rigid member, the other valve comprising a movable piston having a normally closed passage, the outer end of the inlet passage having a passage that is in communication with the passage on the outlet side of the valve, the inner end of the passage being provided with a valve seat, a valve member carried by the piston and adapted to cooperate with the valve seat to close the passage when the piston is in its outermost position, resilient means for urging the piston towards the outer end of the inlet passage, means for opening the valve in the piston when the latter moves a predetermined distance towards the inner end of the inlet passage, the rigid member having an outlet passage whose inner end is in communication with the chamber between the diaphragm and the rigid member, and a nozzle having one end in communication with the inlet passage between the inner valve and the chamber, the other end of said nozzle extending into the outlet passage whereby when the valves in the inlet passage are open a stream of air will flow through the nozzle and into the outlet passage, thereby producing a suction that tends to reduce the pressure in the chamber to a value below that in the outlet passage.

3. A device for inflating a container with a gas to a given pressure from a reservoir containing gas at a higher pressure comprising, a reducing valve having in combination a body member of rigid material, a flexible diaphragm attached at its edges to the member and spaced from a portion of the opposing surface thereof so as to form a chamber, said body member having an inlet passage, the inner end of said passage being in communication with the chamber through an opening of restricted area, a valve in the inlet passage, means for normally retaining the valve in closed position so as to prevent gas from flowing from the reservoir into the chamber, said body member having an outlet passage whose inner end is in communication with the chamber, a nozzle having one end in communication with the inlet passage at a point between the valve and the restricted opening by means of which it is in communication with the chamber and its other end projecting into the outlet passage whereby when the valve is open a stream of gas will flow into the outlet passage and produce a suction tending to reduce the pressure in the chamber, a by-pass extending from the inlet passage to the delivery end of the outlet passage, a valve interposed between the inlet passage and the by-pass and means controlled by the opening and closing of the first valve for opening and closing the last named valve.

4. A device for inflating a container to a given pressure from a reservoir containing air at a higher pressure, comprising, in combination, a reducing valve having a rigid member provided on one side with a recess, a flexible diaphragm secured to the open side of the rigid member and forming with the latter a pressure chamber, the rigid member having an air passage therethrough one end of which forms the inlet and the other end of which forms the outlet, a control valve for controlling the flow of air through the passage, means for normally holding the valve in closed position, means comprising a spring for urging the diaphragm towards the rigid member, means operated by the diaphragm as it moves towards the rigid member for opening the control valve, the rigid member having another passageway for connecting the interior of the pressure chamber with that part of the first named passageway between the control valve and the outlet whereby when the pressure in this part of the first mentioned passageway falls below a predetermined value, the valve will be opened and air permitted to flow, means for preventing the flow of air into the pressure chamber until the pressure in the passageway leading from the control valve to the outlet has increased to a value above that to which the container is to be inflated and then to permit air to flow freely into the pressure chamber, a deflating valve connected with the passageway from the control valve to the outlet and means for retaining this valves closed during the time that the control valve is open.

5. A device for inflating and for deflating a container to a predetermined pressure comprising, in combination, means for connecting the interior of the container with a reservoir containing air at a higher pressure, a valve for controlling the flow of air from the reservoir to the container, means for periodically opening and closing the valve while the pressure in the container is below the predetermined value, the connecting means having an opening to the atmosphere, a normally closed valve for controlling the flow of air through the opening and means for opening the last mentioned valve and thereby connecting the interior of the container with the atmosphere when the pressure in the container is above the predetermined value.

In testimony whereof we affix our signatures.

WILLIAM L. DONKIN.
WORTH G. McCARTY.